United States Patent
Park et al.

(10) Patent No.: US 7,098,986 B2
(45) Date of Patent: Aug. 29, 2006

(54) DATA PAD REGION OF LIQUID CRYSTAL DISPLAY PANEL AND FABRICATING METHOD THEREOF

(75) Inventors: Dae-Lim Park, Kyoungsangbuk-Do (KR); Seong-Soo Hwang, Gyoungsangbuk-Do (KR); Su-Hwan Moon, Gyoungsangbuk-Do (KR); Young-Sik Kim, Kyoungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 48 days.

(21) Appl. No.: 10/670,738

(22) Filed: Sep. 26, 2003

(65) Prior Publication Data

US 2004/0126942 A1    Jul. 1, 2004

(30) Foreign Application Priority Data

Dec. 27, 2002    (KR) ............... 10-2002-0085593

(51) Int. Cl.
*G02F 1/1333*    (2006.01)

(52) U.S. Cl. .............. 349/152; 349/149; 349/187; 349/138

(58) Field of Classification Search ........ 349/149–152, 349/138, 43
See application file for complete search history.

(56) References Cited

U.S. PATENT DOCUMENTS

| | | | |
|---|---|---|---|
| 5,748,179 A * | 5/1998 | Ito et al. ............... | 349/152 |
| 5,835,177 A * | 11/1998 | Dohjo et al. ............ | 349/147 |
| 6,001,539 A * | 12/1999 | Lyu et al. .............. | 430/317 |
| 6,100,954 A * | 8/2000 | Kim et al. .............. | 349/138 |
| 6,281,959 B1 * | 8/2001 | Kim et al. .............. | 349/152 |
| 6,642,972 B1 * | 11/2003 | Yoo et al. .............. | 349/40 |
| 6,771,348 B1 * | 8/2004 | Oh et al. ............... | 349/152 |
| 2001/0030718 A1* | 10/2001 | Yoo et al. .............. | 349/43 |

* cited by examiner

*Primary Examiner*—Dung T. Nguyen
*Assistant Examiner*—Thoi V. Duong
(74) *Attorney, Agent, or Firm*—Morgan, Lewis & Bockius, LLP (57) ABSTRACT

A data pad region of a liquid crystal display panel includes a plurality of data lines vertically arranged at specified intervals, a plurality of data pads respectively connected to the data lines, at least one first side contact with a first area formed in each data pad and at least one second side contact with a second area formed in each data pad, wherein the first area is larger than the second area.

26 Claims, 9 Drawing Sheets

DATA PAD REGION OF LIQUID CRYSTAL DISPLAY PANEL AND FABRICATING METHOD THEREOF

This application claims the benefit of Korean Application No. P2002-085593 filed in Korea on Dec. 27, 2002, which is hereby incorporated by reference.

BACKGROUND OF THE INVENTION

1. Field of the Invention

The present invention relates to a data pad region of a liquid crystal display panel and a fabricating method thereof, and in particular to a data pad region of a liquid crystal display panel and a fabricating method thereof for preventing damage to a data pad region and for securing an electrical contact area.

2. Discussion of the Related Art

In general, a liquid crystal display device displays a desired image by individually supplying a data signal to liquid crystal cells arranged in a matrix form and controlling light transmittance of the liquid crystal cells according to image information. The liquid crystal display device includes a liquid crystal display panel with the liquid crystal cells arranged in a matrix form and a driving unit for driving the liquid crystal cells in each of the liquid crystal cells. The liquid crystal display panel includes a color filter substrate and a thin film transistor array substrate attached with a space therebetween, and a liquid crystal layer formed within the space between the color filter substrate and the thin film transistor array substrate.

A common electrode and a pixel electrode are formed facing each other on inner surfaces of the color filter substrate and the thin film transistor array substrate such that an electric field can be applied to the liquid crystal layer. The pixel electrode is formed in every liquid crystal cell of the thin film transistor array substrate, while the common electrode is integrally formed at the entire surface of the color filter substrate. By controlling a voltage applied to the pixel electrode while the common electrode is receiving another voltage, light transmittance of liquid crystal cells can be individually controlled. To control the voltage applied to the pixel electrode by liquid crystal cells, each liquid crystal cell includes a thin film transistor used as a switching device. On the thin film transistor array substrate of the liquid crystal display panel, a plurality of data lines for transmitting image information from a data driving unit to the liquid crystal cells and a plurality of gate lines for transmitting a scan signal from a gate driving unit to the liquid crystal cells intersect to define liquid crystal cells that are adjacent to every intersection of the data lines and gate lines. The gate driving unit sequentially supplies a scan signal to the gate lines, so that gate lines of liquid crystal cells arranged in the matrix can be selected one by one while image information is supplied to a selected line of the liquid crystal cells from the data driving unit by way of the data lines. Parts of the liquid crystal display device will be described in detail with reference to accompanying drawings.

Figure 1:
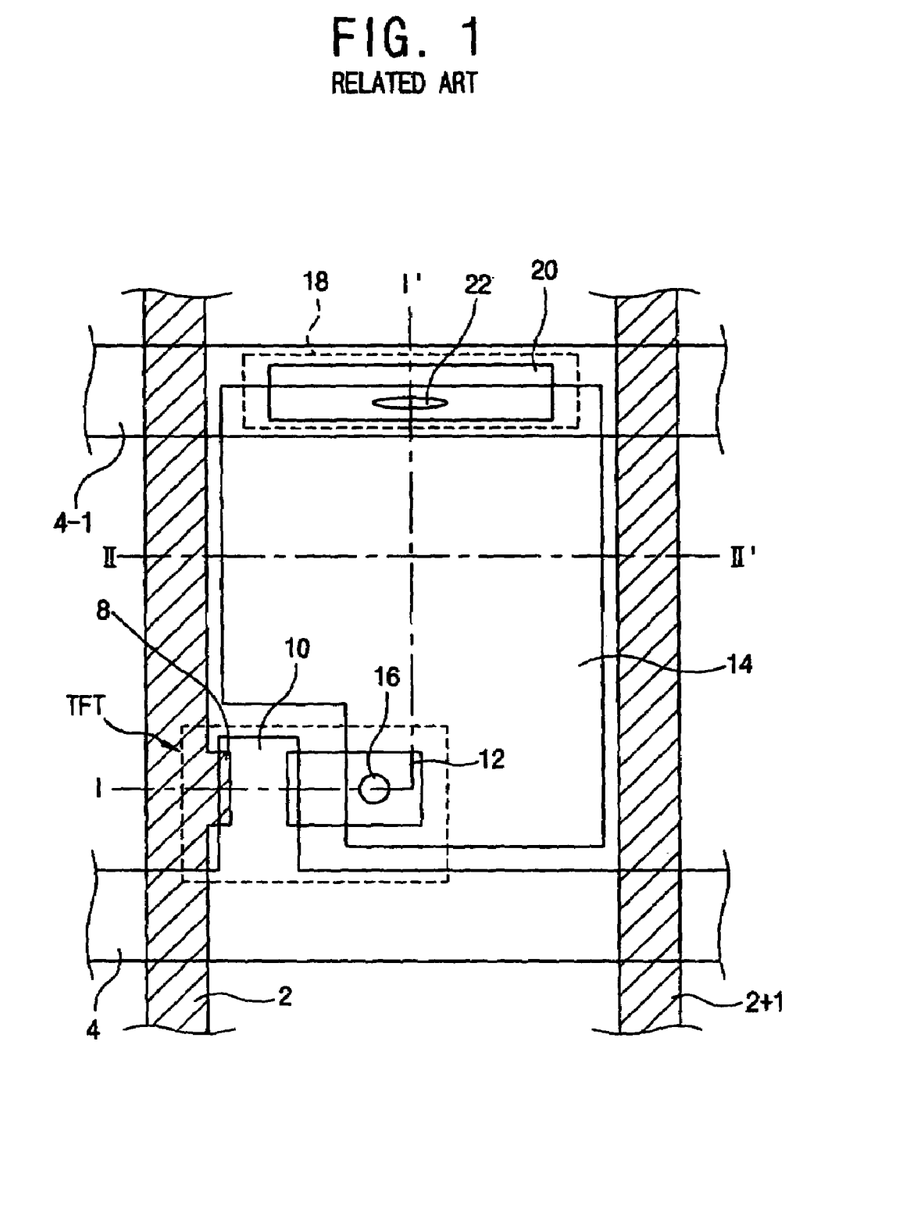
FIG. 1 is a plan view illustrating a unit pixel of a liquid crystal display device in accordance with a related art.

FIG. 1 is a plan view illustrating a unit pixel of liquid crystal display device in accordance with a related art. As shown in FIG. 1, gate lines 4-1 and 4 are horizontally arranged at regular intervals, and data lines 2 and 2+1 are vertically arranged at regular intervals. Accordingly, the gate lines 4-1 and 4 and the data lines 2 and 2+1 cross each other. A unit pixel is defined within the rectangular region formed by the crossing gate lines 4-1 and 4 and data lines 2 and 2+1. The unit pixel includes a thin film transistor (TFT) and a pixel electrode 14.

The thin film transistor (TFT) includes a gate electrode 10 extending from the gate line 4; a source electrode 8 extending from the data line 2 so as to be partly overlapping with the gate electrode 10; and a drain electrode 12 that corresponds to the source electrode 8 across from the gate electrode 10. The source electrode 8 and the drain electrode 12 are formed over the gate electrode 10 so as to be separated. The drain electrode 12 is electrically connected to a pixel electrode 14 through a drain contact hole 16. The pixel electrode 14 is made of a transparent conductive material such as indium tin oxide (ITO) or indium zinc oxide (IZO).

In addition, the thin film transistor (TFT) includes a semiconductor layer (not shown) that becomes a conductive channel between the source electrode 8 and the drain electrode 12 when a scan signal is supplied to the gate electrode 10. The scan signal is supplied to the gate electrode 10 from the gate line 4. When the conductive channel is formed between the source electrode 8 and the drain electrode 12 of the thin film transistor (TFT), a data signal supplied to the source electrode 8 from the data line 2 is transmitted to the drain electrode 12 via the conductive channel.

Because the drain electrode 12 is electrically connected to the pixel electrode 14 through the drain contact hole 16, the data signal supplied to the drain electrode 12 is applied to the pixel electrode 14. Thus, the pixel electrode 14 receives the data signal and generates an electric field across the liquid crystal layer with a common electrode (not shown) formed on a color filter substrate. When the electric field is applied to the liquid crystal layer, the liquid crystal is rotated by dielectric anisotropy and transmits light from a back light. The polarization of transmitted light is adjusted by a voltage value of the data signal.

The pixel electrode 14 also contacts to a storage electrode 20 through a storage contact hole 22. The storage electrode 20 is operated as a storage capacitor 18 by being overlapped with a preceding gate line 4-1 with a gate insulating layer (not shown) therebetween. Accordingly, the storage capacitor 18 charges to a voltage value of the data signal for a turn-on period of the thin film transistor (TFT) in which the scan signal is applied to the gate line 4. Afterward, the storage capacitor 18 supplies the charged voltage to the pixel electrode 14 during a turn-off period of the thin film transistor (TFT) such that operation of the liquid crystal is maintained.

Figure 2:
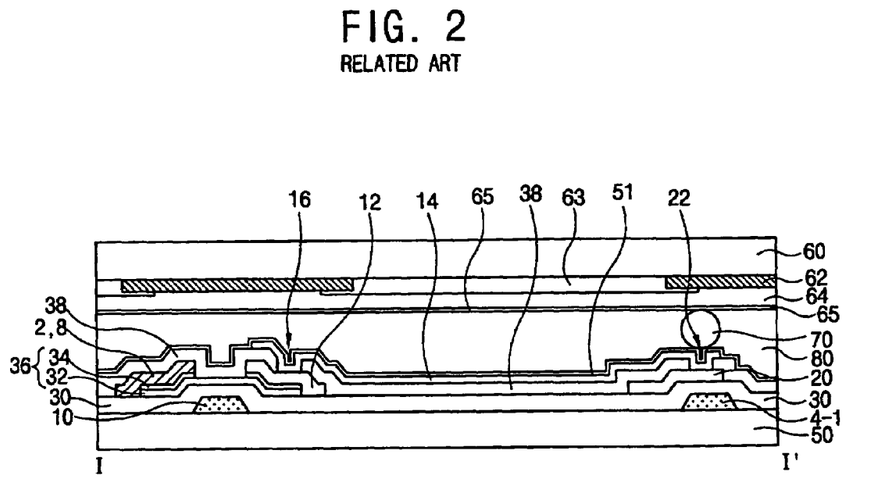
FIG. 2 is an exemplary view illustrating a section of a unit pixel taken along the line I–I' in FIG. 1.

FIG. 2 is an exemplary view illustrating a section of a unit pixel taken along a line I–I' in FIG. 1. As shown in FIG. 2, the liquid crystal display panel includes a color filter substrate 60 and a thin film transistor array substrate 50 attached with a space maintained therebetween by a spacer 70. A liquid crystal layer 80 is positioned within the space between the thin film transistor array substrate 50 and the color filter substrate 60.

Fabrication processes of a thin film transistor will be described with reference to FIG. 2. First, a gate electrode 10 is formed by applying metal material on the thin film transistor array substrate 50 and patterning the metal material. Then, a gate insulating layer 30 is formed by depositing an insulating material at an upper surface of the thin film transistor array substrate 50 on which the gate electrode 10 is formed. An active layer 36 is formed on the gate insulating layer 30 by sequentially depositing a semiconductor layer 32 made of amorphous silicon and an ohmic contact layer 34 made of n+ amorphous silicon doped with phosphorus (P) at high concentration and patterning the semiconductor layer 32 and the ohmic contact layer 34. By depositing metal material on the gate insulating layer 30 and the ohmic contact layer 34 and patterning the metal material, the source electrode 8 and the drain electrode 12 of the thin film transistor (TFT) are formed. The source electrode 8 and the drain electrode 12 are patterned so as to be separated on the surface of the active layer 36.

The ohmic contact layer 34 is exposed on the surface of the active layer 36 between the source electrode 8 and the drain electrode 12. The exposed ohmic contact layer 34 is removed in the patterning process of the source electrode 8 and the drain electrode 12. Subsequently, semiconductor layer 32 is exposed between the source electrode 8 and the drain electrode 12 by removing the ohmic contact layer 34, and the exposed semiconductor layer 32 is a channel region of the thin film transistor (TFT).

A passivation film 38 is then formed by depositing an insulating material on the gate insulating layer 30 on which the source electrode 8 and the drain electrode 12 were formed including the exposed semiconductor layer 32. A drain contact hole 16 exposing a portion of the drain electrode 12 is formed by selectively etching a portion of the passivation film 38 on the drain electrode 12. By forming a transparent electrode material on the passivation film 38 and patterning the transparent electrode material, the pixel electrode 14 is formed so as to be connected to the drain electrode 12 through the drain contact hole 16.

After forming an aligning layer 51 on the surface of the resultant structure, a rubbing process is performed. More particularly, the surface of the aligning layer 51 is rubbed by a fabric at a uniform pressure and speed. High molecule chains on the surface of the aligning layer 51 are aligned in a specified direction. This determines an initial aligning direction of the liquid crystal.

Fabrication processes of the storage capacitor region will now be described with reference to accompanying FIG. 2. First, the gate line 4–1 is patterned on the thin film transistor array substrate 50, and the gate insulating layer 30 is formed thereon. The gate line 4–1 is formed while the gate electrode 10 of the thin film transistor (TFT) is formed. The gate insulating layer 30 is the same as the gate insulating layer 30 of the thin film transistor (TFT). The storage electrode 20 is patterned on the surface of the gate insulating layer 30. The storage electrode 20 is formed while forming of the source electrode 8 and the drain electrode 12 of the thin film transistor (TFT), and operated as the storage capacitor 18 by being overlapped with a portion of the gate line 4–1 with the gate insulating layer 30 therebetween.

After forming the passivation film 38 on the gate insulating layer 30 and the storage electrode 20, a storage contact hole 22 is formed exposing a portion of the storage electrode 20 by etching a portion of the passivation film 38. The passivation film 38 is the same as the passivation film 38 in the thin film transistor (TFT) region, and the storage contact hole 22 is formed while forming the drain contact hole 16 of the thin film transistor (TFT). The pixel electrode 14 is then patterned on the passivation film 38, and connected to the storage electrode 20 through the storage contact hole 22. The pixel electrode 14 is the same as the pixel electrode 14 formed on the thin film transistor (TFT) region.

Fabrication processes of the color filter substrate 60 will be described with reference to FIG. 2. First, a black matrix 62 is coated on the color filter substrate 60 with specified intervals. A red (R), green (G) and blue (B) color filter 63 is formed on the surface of the color filter substrate 50 on which the black matrix 62 is formed. A common electrode 64 is formed by forming a metal material on the surface of the color filter 63 including the black matrix 62 and patterning the metal material.

After forming an aligning layer 65 on the surface of the resultant structure, a rubbing process is performed. After the thin film transistor array substrate 50 and the color filter substrate 60 is fabricated, a sealant (not shown) is formed on the thin film transistor array substrate 50, and a spacer 70 is formed on the color filter substrate 60. The spacer 70 can be formed on the thin film transistor array substrate 50 and the sealant can be formed on the color filter substrate 60. The spacer 70 can be positioned by a scattering method, such as scattering glass beads or plastic beads having a certain diameter.

After forming the sealant and the spacer 70, the thin film transistor array substrate 50 and the color filter substrate 60 are attached to each other. The attached thin film transistor array substrate 50 and the color filter 60 are cut into unit liquid crystal display panels. To improve the yield, plural liquid crystal display panels are simultaneously formed on a large-sized glass substrate. Thus, a cutting process is required.

A liquid crystal layer 80 is formed within a space between the aligning layer 51 of the thin film transistor array substrate 50 and the aligning layer 65 of the color filter substrate 60 by injecting liquid crystal into the cut unit liquid crystal panel and sealing an injection hole. After injecting liquid crystal into plural liquid crystal panels, the attached thin film transistor array substrate 50 and color filter substrate 60 are cut into unit liquid crystal panels. However, due to the increased size of a unit liquid crystal panel, it is difficult to perform a process for injecting liquid crystal uniformly.

Productivity may be lowered due to liquid crystal injection defect. Accordingly a method of injecting liquid crystal after the attached thin film transistor array substrate 50 and color filter substrate 60 that is cut into unit liquid crystal panels has been proposed. Since the unit liquid crystal panel has only a few μm (microns) of cell gap for the hundreds of $cm^2$ area, a vacuum injection method is most frequently used, which uses a pressure difference between an inner side and an outer side of the unit liquid crystal panel, in order to effectively inject the liquid crystal thereto.

Figure 3:
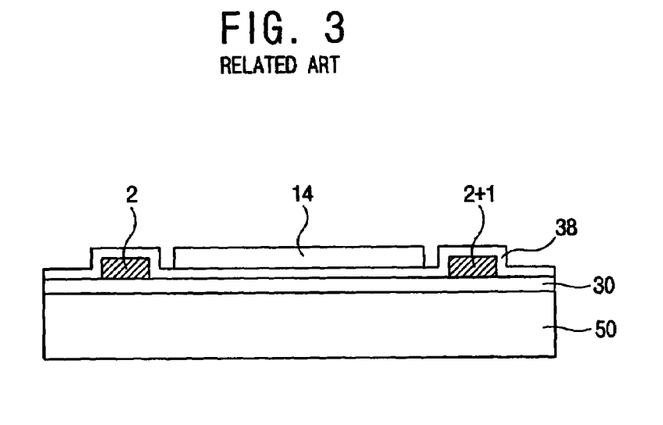
FIG. 3 is an exemplary view illustrating a section of a unit pixel taken along the line II–II' in FIG. 1.

FIG. 3 is an exemplary view illustrating a section of a unit pixel taken along a line II–II' in FIG. 1. FIG. 3 shows the gate insulating layer 30 formed on the surface of the thin film transistor array substrate 50; the data lines 2 and 2+1 patterned on the surface of the gate insulating layer 30 so as to be separated from each other; the passivation film 38 formed on the surface of the gate insulating layer 30 including the data lines 2 and 2+1; and the pixel electrode 14 patterned on the surface of the passivation film 38 in which the data lines 2 and 2+1 are separated. Although not shown in FIG. 3, as described in the thin film transistor (TFT) fabrication processes with regard to FIG. 2, the active layer 36 including the semiconductor layer 32 and the ohmic contact layer 34 may be remained on the lower portion of the data lines 2 and 2+1. Usually, the passivation film 38 is made of an inorganic thin film, such as SiNx or SiOx, etc.

By overlapping the data lines 2 and 2+1 with a portion of the pixel electrode 14 by the passivation film 38, an aperture ratio of the liquid crystal display device can be further improved. However, because the passivation film 38 is made of a thin film inorganic material, such as SiNx or SiOx, when the data lines 2 and 2+1 are overlapped with a portion of the pixel electrode 14 by the passivation film 38, signal characteristics are deteriorated because the data lines 2 and 2+1 and the pixel electrode 14 are influenced mutually (for example, parasitic capacitance). To prevent deterioration of the signal characteristics in case that the data lines 2 and 2+1 and the pixel electrode 14 are overlapped with a portion to each other by the passivation film 38, a high aperture ratio liquid crystal display device using thick film organic material such as BCB (benzocyclobutene), etc. having low dielectric constant for a material of the passivation film 38 has been suggested. The high aperture ratio liquid crystal display device will be described with reference to accompanying drawings.

Figure 4:
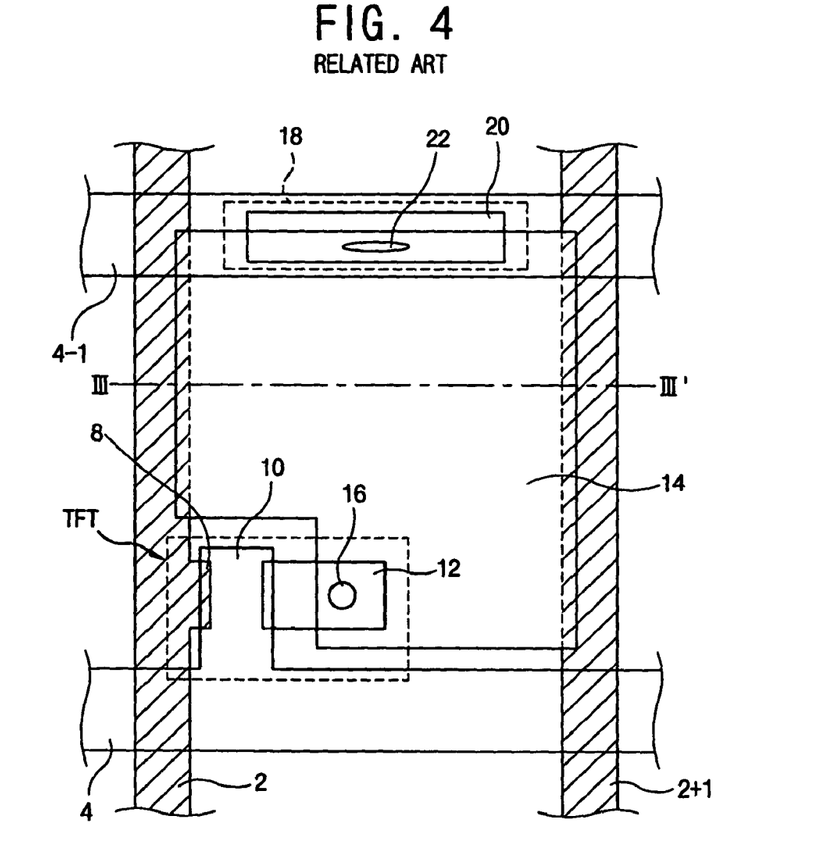
FIG. 4 is an exemplary view illustrating a plan construction of a high aperture ratio liquid crystal display device.
Figure 5:
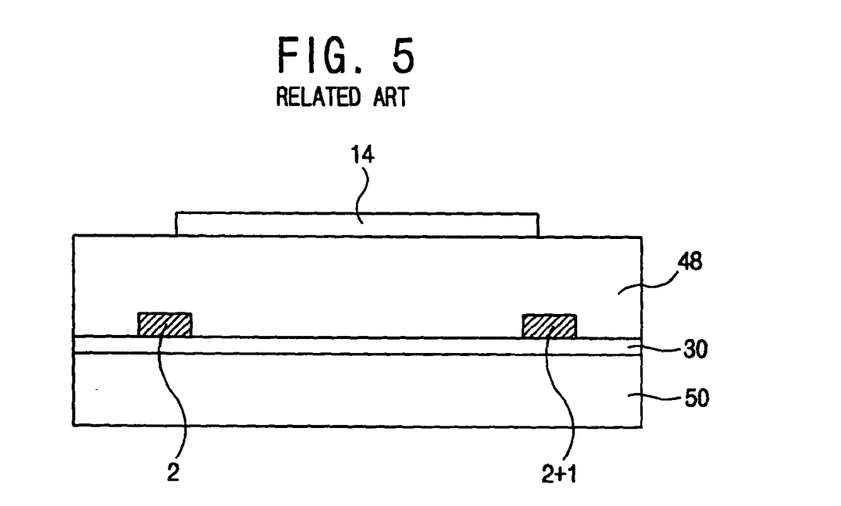
FIG. 5 is an exemplary view illustrating a section taken along the line III–III' in FIG. 4.

FIG. 4 is an exemplary view illustrating a plan view of the high aperture ratio liquid crystal display device, and FIG. 5 is an exemplary view illustrating a section taken along a line III–III' in FIG. 4. First, FIG. 4 has the same plan construction with FIG. 1, except for the overlapping of a portion of the pixel electrode 14 with the data lines 2 and 2+1. FIG. 5 shows the gate insulating layer 30 formed on the surface of the thin film transistor array substrate 50; the data lines 2 and 2+1 patterned on the surface of the gate insulating layer 30 so as to be separated from each other; the passivation film 48 formed on the surface of the gate insulating layer 30 including the data lines 2 and 2+1; and the pixel electrode 14 patterned on the surface of the passivation film 38 in which the data lines 2 and 2+1 are separated so as to be partly overlapped with the data lines 2 and 2+1. Although not shown in FIG. 5, as described in the thin film transistor fabrication processes in FIG. 2, the active layer 36 including the semiconductor layer 32 and the ohmic contact layer 34 may be remained on the lower portion of the data lines 2 and 2+1. By forming the passivation film 48 as a thick film by using an organic material such as BCB, etc. having low dielectric constant, although the data lines 2 and 2+1 are overlapped with a portion of the pixel electrode 14, it is possible to prevent the occurrence of mutual influence in the overlapped regions of the pixel electrode 14.

Figure 6:
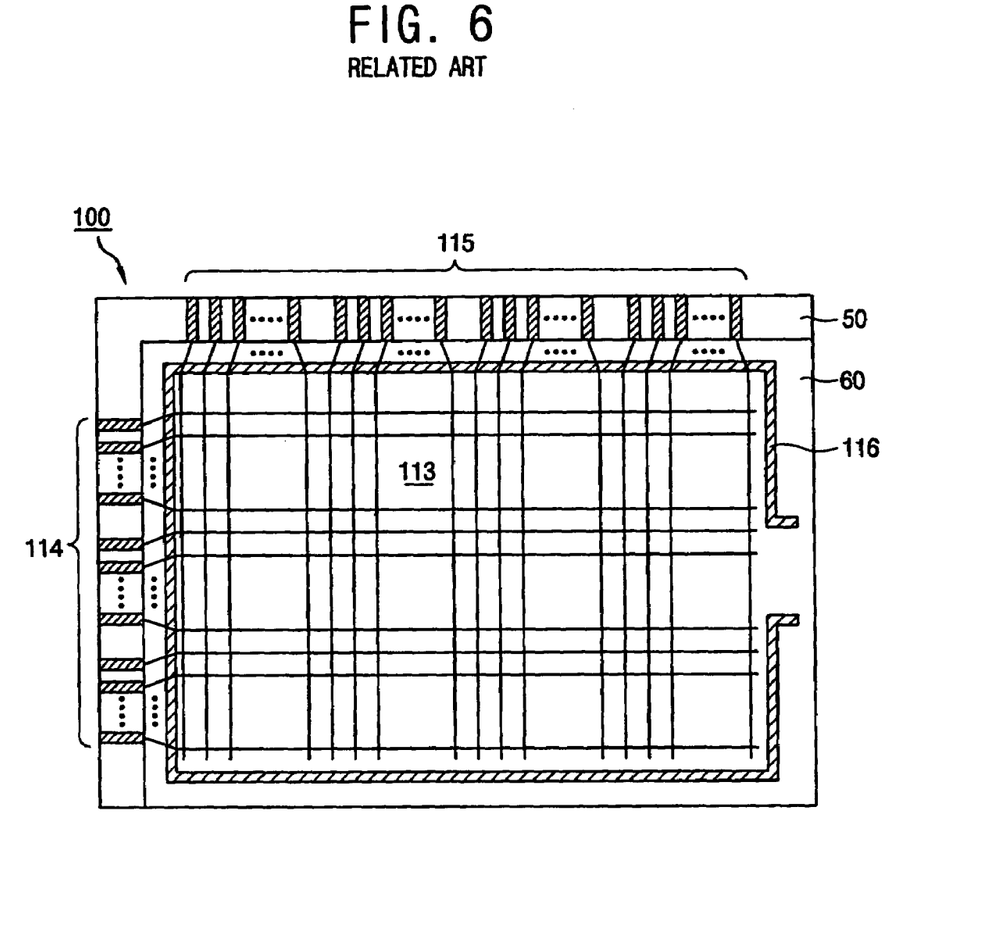
FIG. 6 is an exemplary view illustrating a schematic plan structure of a unit liquid crystal display panel of the related art.

FIG. 6 is an exemplary view illustrating a schematic plan structure of the unit liquid crystal display panel. As shown in FIG. 6, a unit liquid crystal display panel 100 is constructed by attaching the thin film transistor array substrate 50 to the color filter substrate 60, an upper longer side and a left shorter side of the thin film transistor array substrate 50 protrude with respect to the color filter substrate 60. The unit liquid crystal display panel 100 includes an image display region 113 on which the gate lines and the data lines cross each other. The unit pixels are arranged in a matrix form. A gate pad region 114 is connected to the gate lines of the image display region 113. The data pad region 115 is connected to the data lines of the image display region 113.

The thin film transistor array substrate 50 and the color filter substrate 60 are separated from each other by the spacer, and attached to each other by a seal pattern 116 formed at the periphery of the image display region 113. The gate pad region 114 is formed at the edge of the thin film transistor substrate 50 in which the shorter side protrudes in comparison with the color filter substrate 60, and the data pad region 115 is formed at the edge of the thin film transistor substrate 50 in which the longer side protrudes with respect to the color filter substrate 60. In addition, the gate pad region 114 supplies scan signals from the gate driver integrated circuit to the gate lines of the image display region 113. The data pad region 115 supplies image information from the data driver integrated circuit to the data lines of the image display region 113.

Figure 7:
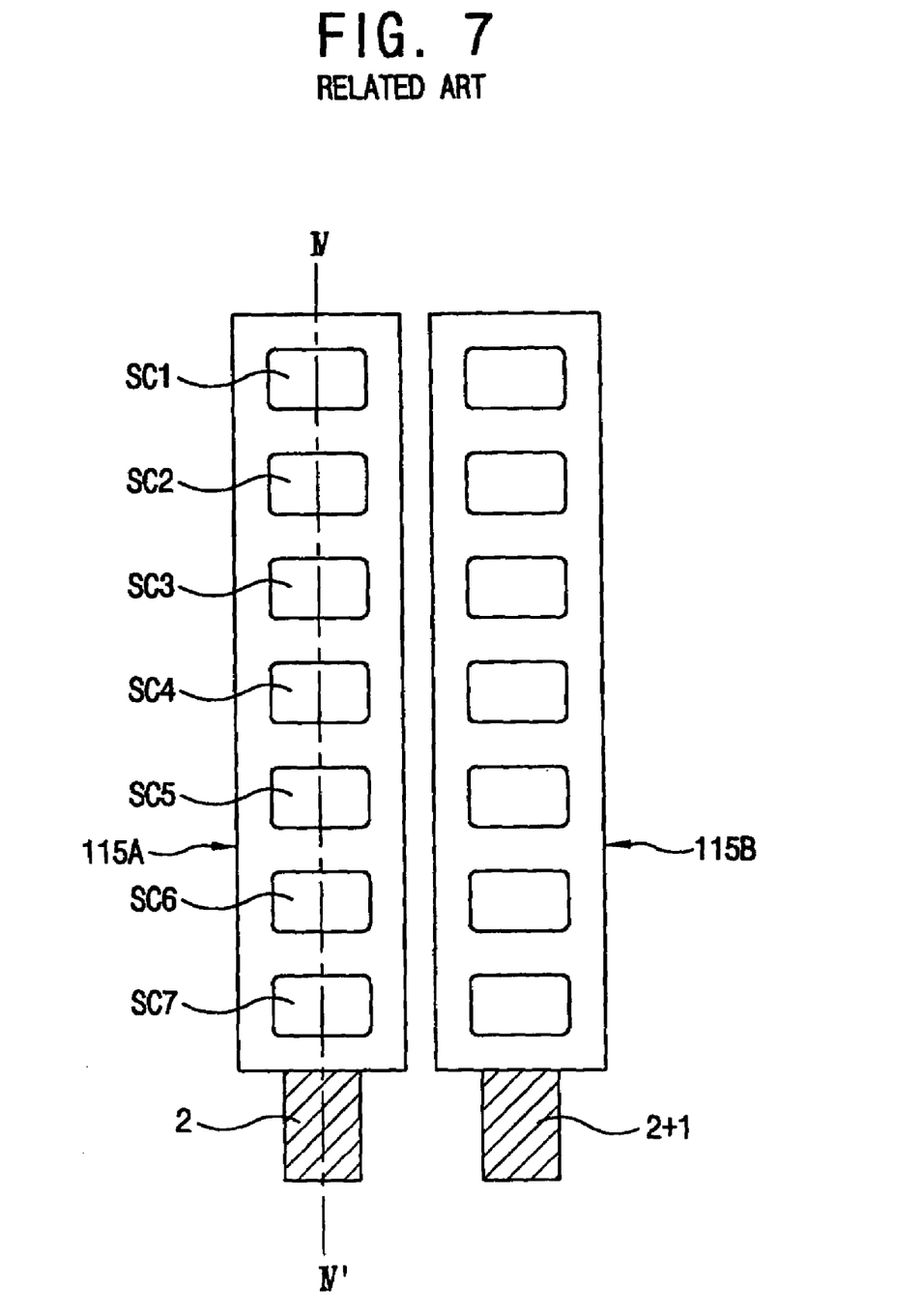
FIG. 7 is an exemplary view illustrating a portion of a data pad region in detail in FIG. 6.

FIG. 7 is detailed view illustrating a portion of the data pad region 115 in FIG. 6. As shown in FIG. 7, the data pad region includes data lines 2 and 2+1 that are vertically arranged at regular intervals and data pads 115A and 115B that are electrically connected to the end of the data lines 2 and 2+1. The data pads 115A and 115B respectively include side contacts SC1 to SC7 separated from each other at regular intervals.

Figure 8A:
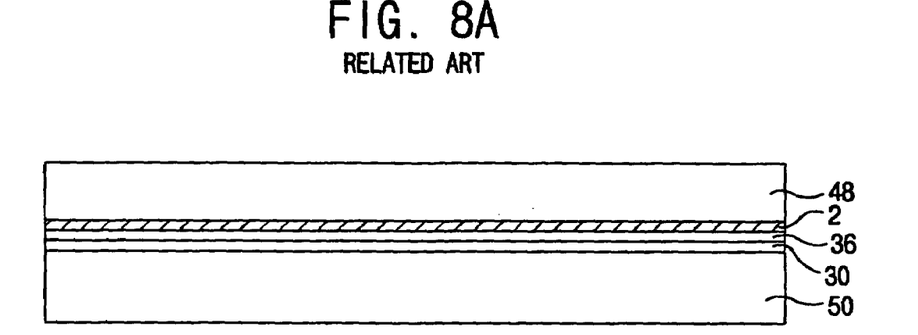
FIGS. 8A to 8C are exemplary views sequentially illustrating a section construction of the data pad region taken along a line IV–IV' in FIG. 7.
Figure 8B:
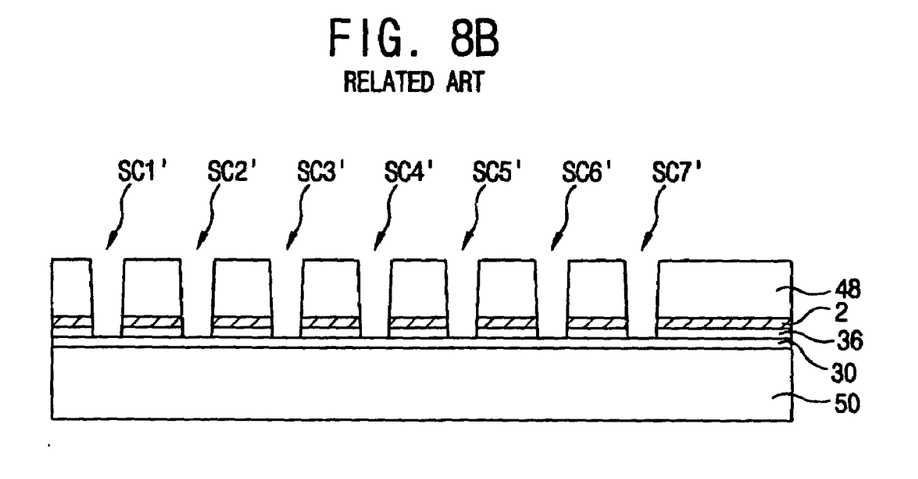
Figure 8C:
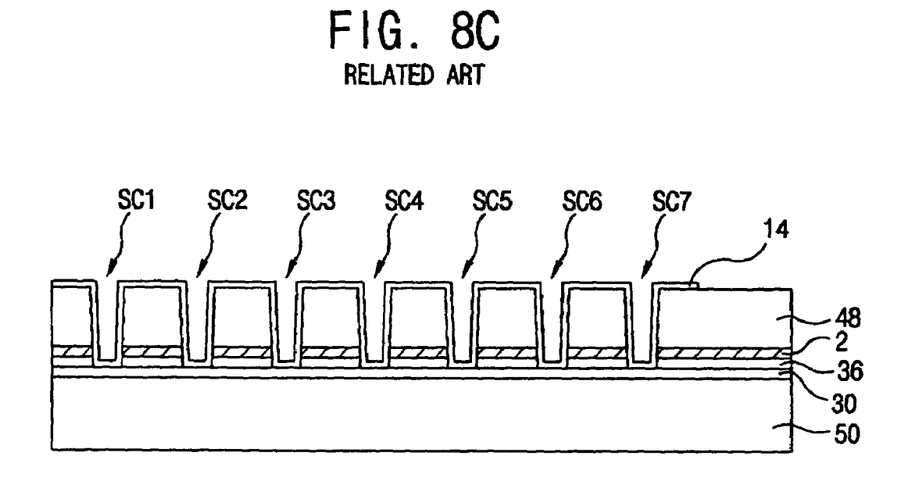

FIGS. 8A to 8C are exemplary views sequentially illustrating a section construction of the data pad region 115 taken along a line IV–IV' in FIG. 7. As shown in FIG. 8A, the gate insulating layer 30, the active layer 36, the data line 2 and the passivation film 48 made of an organic material such as BCB, etc. are sequentially formed on the surface of the thin film transistor array substrate 50. As depicted in FIG. 2, the gate insulating layer 30, the active layer 36 and the data line 2 are formed in the fabrication of the thin film transistor (TFT). As depicted in FIGS. 4 and 5, the passivation film 48 made of an organic material such as BCB, etc. is formed to improve an aperture ratio of the liquid crystal display device.

As shown in FIG. 8B, side contact holes SC1' to SC7' are formed by etching the passivation film 48. As described above in reference to FIG. 2, etching of the passivation film 48 is performed simultaneously in forming of the drain contact hole 16 for connecting the drain electrode 12 and the pixel electrode 14 of the thin film transistor (TFT), by a dry etching method. In general, the data line 2 is made of a conductive material such as Cr. However, according to size increase and high resolution trends of the liquid crystal display device, a width of the data line 2 has to be reduced. However, a reduced width increases resistance even though quantity of image information transmitted through the data line 2 is increasing as display panels become larger. To improve image information transmission performance, a conductive material, such as Mo, having less resistance than Cr has been recently used for the data line 2. However, a conductive material, such as Mo, used for the data line 2 can be etched by the dry etching of the passivation film 48.

The data line 2 made of a conductive material such as Mo is electrically contacted to the pixel electrode 14 at the side of the side contact holes SC1' to SC7'. The more the number of the side contact holes SC1' to SC7', the more a contact area of the data line 2 and the pixel electrode 14 can be secured, and accordingly resistance can be reduced. In addition, the active layer 36 formed in fabrication of the thin film transistor (TFT) may be etched by the dry etching of the passivation film 48. Thus, by etching the data line 2 and the active layer 36, the gate insulating layer 30 is exposed to the bottom surface of the side contact holes SC1' to SC7'.

Then, as shown in FIG. 8C, by patterning the pixel electrode 14 on the surface of the resultant structure, the pixel electrode 14 is electrically contacted to the side of the data line 2 through the side contacts SC1 to SC7. As described above with reference to FIG. 2, patterning of the pixel electrode 14 is performed simultaneously while the patterning of the pixel electrode 14 of a unit pixel, and a transparent conductive material, such as ITO, is applied to the pixel electrode 14.

In a subsequent probe inspection, needles are contacted to the data pad region 115, and a test signal is applied. In more detail, when the liquid crystal display panel is fabricated, a probe inspection for inspecting an open defect or a short defect of the gate lines and the data lines through images displayed on the image display region is performed by applying test signals to the gate lines and the data lines through the gate pad region and the data pad region. However, in the related art, because the plural side contacts SD1 to SD7 are formed on the data pad region, contact between the needles and the side contacts SD1 to SD7 can not be performed smoothly.

More particularly, the data pad region 115 has peaks and depressions because of the plural side contacts SD1 to SD7. Accordingly, when the needles are in contact, a scratch may occur on the surface of the data pad region 115 if a misalignment occurs. This causes a defect in the liquid crystal display panel. Further, replacement of damaged needles may be required.

In addition, in the data pad region 115, an inorganic material, such as SiNx or SiOx, used for the gate insulating layer 30 has good interfacial adhering characteristics. On the contrary, an organic material such as BCB used for the passivation film 48 has poor interfacial adhering characteristics. Accordingly the pixel electrode 14 can be separated from the organic passivation film 48. More particularly, if an area contacted to the passivation film 48 is wider than an area contacted to the gate insulating layer 30 exposed to the bottom surface of the side contact holes SC1' to SC7', the pixel electrode 14 may be easily separated from the passivation film 48.

After the liquid crystal display panel is fabricated, when a defective TAB occurs in a module process for electrically contacting the data driver integrated circuit to the data pad region 115 by a TAB (tape-automated bonding) method, the defective TAB is detached from the data pad region 115. Because the pixel electrode 14 is adhered to the TAB, a portion or whole pixel electrode 14 is separated from the passivation film 48. Accordingly, the data pad region 115 is damaged, and becomes a defect of the liquid crystal display panel. In addition, when the defective TAB is detached from the data pad region 115, the pixel electrode 14 and the passivation film 48 may be separated from the active layer 36 since the pixel electrode 14 adhered to the defective TAB.

To improve interfacial adhering characteristics of the passivation film 48 made of an organic material, such as BCB, a triple layer structure depositing an upper SiNx film/BCB film/lower SiNx film can be used as the passivation film 48. However, even in the triple layer structure, when the defective TAB is detached from the data pad region 115, the pixel electrode 14 and the upper SiNx film may separate from the BCB film since the pixel electrode 14 is adhered to the defective TAB. In addition, the pixel electrode 14, the upper SiNx film and the BCB film may separate from the lower SiNx. Thus, there is no interfacial adhering characteristics improvement in the data pad region 115 with a triple layer structure.

SUMMARY OF THE INVENTION

Accordingly, the present invention is directed to a data pad region of a liquid crystal display panel and a fabrication method thereof that substantially obviate one or more of the problems due to limitations and disadvantages of the related art.

An object of the present invention is to provide a data pad region of a liquid crystal display panel and a fabrication method thereof capable of preventing damage of a data pad region and securing an electrical contact region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data pad region of a liquid crystal display panel includes a plurality of data lines vertically arranged at specified intervals, a plurality of data pads respectively connected to the data lines, at least one first side contact with a first area formed in each data pad and at least one second side contact with a second area formed in each data pad, wherein the first area is larger than the second area.

In another aspect, a method for fabricating a data pad region of a liquid crystal display panel in accordance with the present invention includes: forming a gate insulating layer, data lines and a passivation film in a data pad forming region of a substrate; forming at least one first side contact hole with a first area at the central region of the data pad forming region and forming at least two second side contact holes with a second area respectively at both edges of the data pad forming region, wherein the first area is larger than the second area; and forming at least one first side contact electrically connecting one of the data lines to a conductive layer at the first side contact hole and forming at least one second side contact electrically contacting the data line to the conductive layer at the second side contact hole by patterning a conductive material.

In another aspect, a liquid crystal display panel has a substrate having an image display region with unit pixels arranged in a matrix and a data pad region at the periphery of the image display region, wherein the data pad region includes: a plurality of data lines vertically arranged at specified intervals; a plurality of data pads respectively connected to the data lines; at least one first side contact with a first area formed in each data pad; and at least one second side contact with a second area formed in each data pad, wherein the first area is larger than the second area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 9:
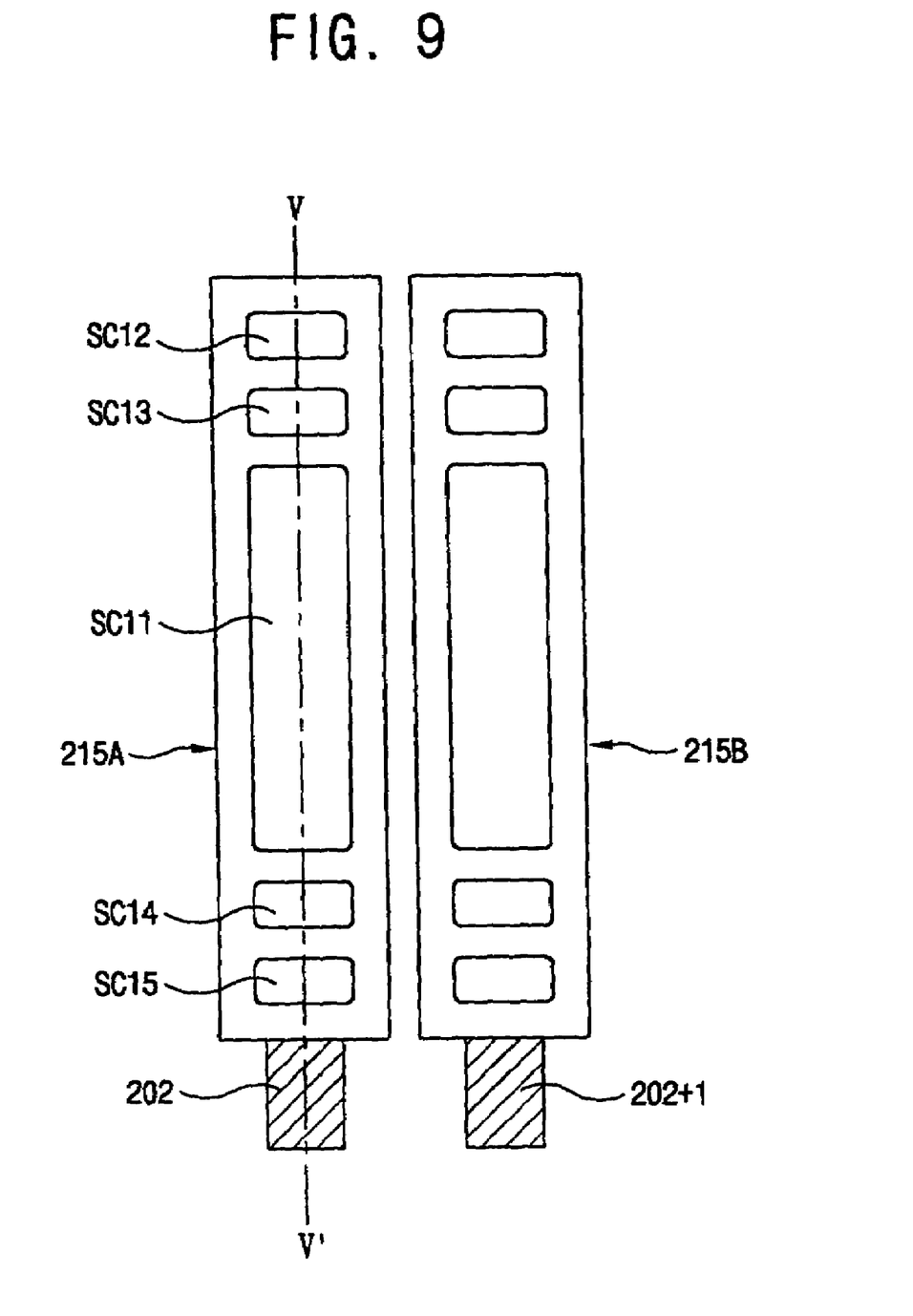
FIG. 9 is an exemplary view illustrating a section of a data pad region of a liquid crystal display penal in accordance with a first embodiment of the present invention.

FIG. 9 is an exemplary view illustrating a section of a data pad region of a liquid crystal display penal in accordance with a first embodiment of the present invention. As shown in FIG. 9, the data pad region of a liquid crystal display panel includes data lines 202 and 202+1 that are vertically arranged at specified intervals, and data pads 215A and 215B that are electrically connected to the data lines 202 and 202+1. A first side contact SC11 is respectively formed at the central portion of the data pads 215A and 215B, and a plurality of second side contacts SC12 to SC15 having an area smaller than that of the first side contact SC11 are respectively formed at the top end and the bottom end of the data pads 215A and 215B so as to be separated from each other at specified intervals. When a defective TAB is detached from the data pad region due to TAB defect in a subsequent module process, the first side contact SC11 having a wider area than those of the plurality of the side contacts SC12 to SC15 prevents films formed on the data pad region from being separated from the data pad region by securing a physical contact area of the films supporting the data pads 215A and 215B. The plurality of the second side contacts SC12 to SC15 having a smaller area than that of the first side contact SC11 prevents an increase in electrical contact resistance for the data pad region by securing a physical contact area of the films supporting the data pads 215A and 215B.

Figure 10A:
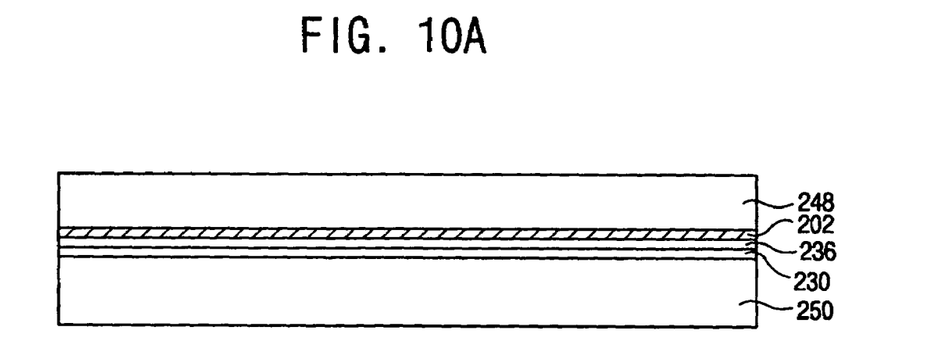
FIGS. 10A to 10C are exemplary views sequentially illustrating a section construction of the data pad region taken along a line V–V' in FIG. 9.
Figure 10B:
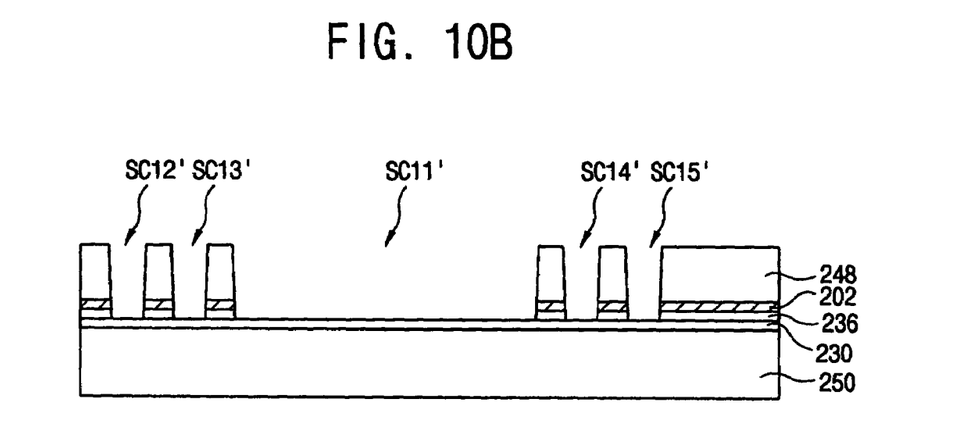
Figure 10C:
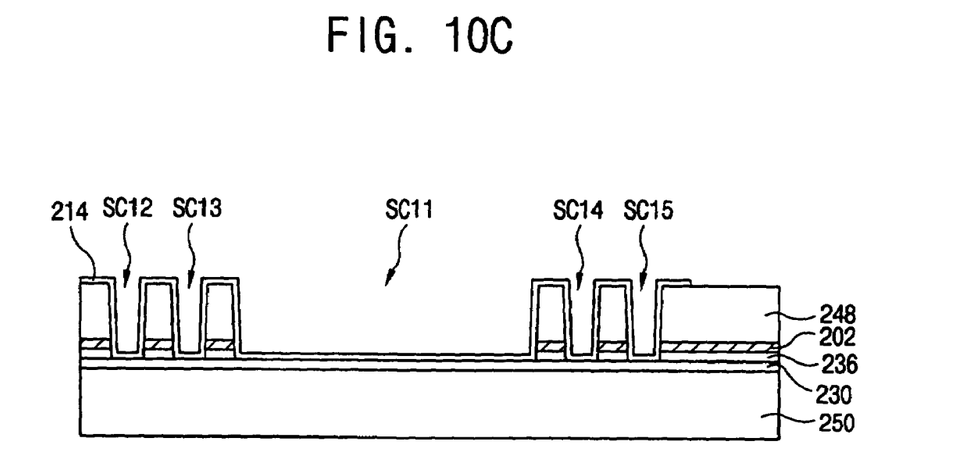

FIGS. 10A to 10C are cross-sectional views sequentially illustrating a section construction of the data pad region taken along a line V–V' in FIG. 9. As shown in FIG. 10A, a gate insulating layer 230, an active layer 236, a data line 202 and a passivation film 248 made of an organic material such as BCB are sequentially formed in the data pad forming region of a substrate 250. The substrate 250 is a thin film transistor array substrate of a liquid crystal display panel to be attached to a color filter substrate. A longer side and a shorter side of the thin film transistor array substrate are protrudes with respect to the color filter substrate. A gate pad region and a data pad region are formed on the protruded regions of the substrate 250. The substrate 250 includes: an image display region on which the gate lines horizontally arranged at a regular intervals and the data lines vertically arranged at a regular intervals cross with each other; unit pixels arranged in a matrix; the gate pad region connected to the gate lines of the image display region; and the data pad region connected to the data lines of the image display region. Thin film transistors transmit image information to the display region through the data lines of the substrate 250.

At the same time as the thin film transistor in a unit pixel of the substrate 250 is formed, the gate insulating layer 230, the active layer 236, the data line 202 are simultaneously formed on the data pad forming region of the substrate 250. The passivation film 248 made of an organic material, such as BCB, is formed to improve aperture ratio of the liquid crystal display panel.

As shown in FIG. 10B, a first side contact hole SC11' is formed at the central portion of the data pad forming region, and a plurality of the second side contact holes SC12' to SC15' having an area smaller than that of the first side contact hole SC11' are formed at both sides of the data pad forming region by etching the passivation film 248. When forming a drain contact hole for connecting a drain electrode to a pixel electrode of the thin film transistor, etching of the passivation film 248 is also performed. Because the passivation film 248 is made of an organic material, such as BCB, a dry etching method is used to etch the passivation film 248.

Because of the large size and high resolution trends of the liquid crystal display device, a conductive material, such as Mo, having less resistance than Cr is used for the data line 202. The conductive material, such as Mo, is etched by the dry etching of the passivation film 248. The data line 202 made of a conductive material, such as Mo, is electrically contacted to a pixel electrode 214 at the sides of the first side contact hole SC11' and the second side contact holes SC12' to SC15'. In addition, the data line 202 and the active layer 236 are etched by the dry etching of the passivation film 248. The gate insulating layer 230 is exposed at the bottom surface of the first side contact hole SC11' and the second side contact holes SC12' to SC15'.

Then, as shown in FIG. 10C, by patterning a pixel electrode 214 on the surface of the resultant structure, the pixel electrode 214 is electrically contacted to the side of the data line 202 and physically contacted to the surface of the exposed gate insulating layer 230 through the first side contact SC11 and through the second side contacts SC12 to SC15. Patterning of the pixel electrode 214 is performed simultaneously while patterning the pixel electrode 214 of a unit pixel and a transparent conductive material, such as ITO, is applied to the pixel electrode 214.

Because the first side contact SC11 has a wider area than those of the plurality of the second side contacts SC12 to SC15, physical adhering force of the pixel electrode 214 and the gate insulating layer 230 is strengthened by securing a wide contact area between the pixel electrode 214 and the gate insulating layer 230 having good interfacial adhering characteristics. Further, because the second side contacts SC12 to SC15 are separated at a certain intervals and have an area smaller than that of the first side contact SC11, electrical contact resistance is reduced by securing a side contact area of the data line 202 and the pixel electrode 214. Also, in a probe inspection, needles are contacted to the first side contact SC11 having an area wider than those of the second side contacts SC12 to SC15. Accordingly, the alignment margin of the needles and the first side contact SC11 is secured. Unlike the related art, it is possible to prevent the occurrence of scratches on the surface of the data pad region caused by sliding of the needles due to misalignment. Accordingly, damage to the needles can be prevented.

The bottom surface of the first side contact SC11 has an area wider than those of the second side contacts SC12 to SC15. Thus, the data pad 214 is widely secured to an area contacting to the gate insulating layer 230 made of SiNx or SiOx having good interfacial adhering characteristics. Because physical adhering force of the pixel electrode 214 is strengthened, unlike the related art, it is possible to prevent the pixel electrode 214 from separating from the passivation film 248.

After the liquid crystal display panel is fabricated, when a TAB defect occurs in a module process for electrically contacting a data driver integrated circuit to the data pad region by a TAB (tape-automated bonding) method, it is possible to prevent the pixel electrode 214 from being separated partly or wholly from the passivation film 248 since the adhesion of the pixel electrode 214 is stronger to the gate insulating layer 210 than to the defective TAB. Further, when the defective TAB is detached from the data pad region, it is also possible to prevent the pixel electrode 214 and the passivation film 248 from being separated from the active layer 236.

Figure 11:
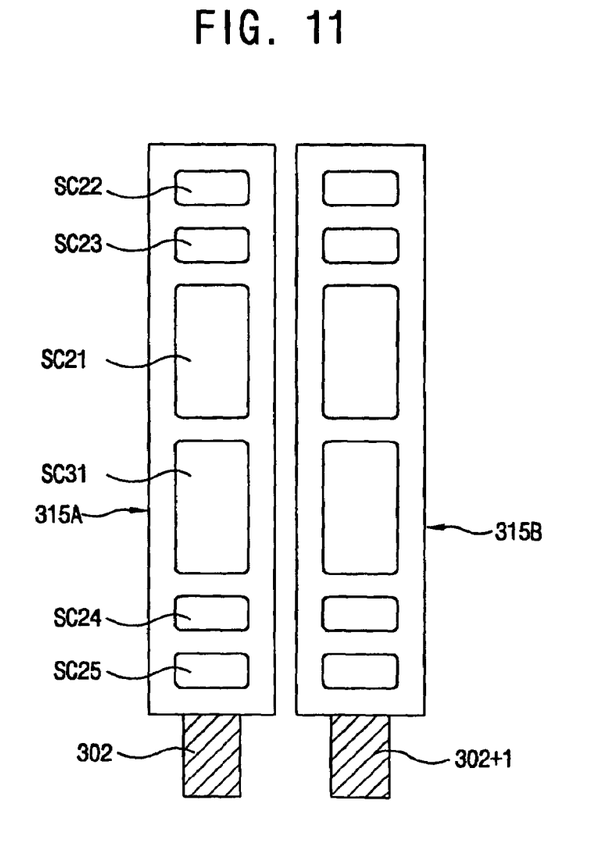
FIG. 11 is an exemplary view illustrating a section of a data pad region of a liquid crystal display penal in accordance with a second embodiment of the present invention.

FIG. 11 is an exemplary view illustrating a section of a data pad region of a liquid crystal display penal in accordance with a second embodiment of the present invention. As shown in FIG. 11, data lines 302 and 302+1 are vertically arranged at specified intervals, and data pads 315A and 315B are electrically connected to the data lines 302 and 302+1. Two first side contacts SC21 and SC22 are respectively formed at the central portion of the data pads 315A and 315B. A plurality of second side contacts SC22 to SC25 having an area smaller than that of the first side contacts SC21 and SC22 are respectively formed at the top end and the bottom end of the data pads 315A and 315B so as to be separated from each other at specified intervals. In the data pad region of the liquid crystal display panel in accordance with the second embodiment of the present invention, the data pad region of the liquid crystal display panel includes two first side contacts SC21 and SC31 having an area wider than those of the plurality of second side contacts SC22 to SC25. However, it is also possible to form more first side contacts (not less than two) in consideration of a physical contact area and an electrical contact area of the films constructing the data pads 315A to 315B.

In comparison with the first embodiment of the present invention, the second embodiment of the invention is different in that the data pad region of the liquid crystal display panel of the second embodiment of the present invention includes two first side contacts SC21 and SC31 having an area wider than those of the plurality of the second side contacts SC22 to SC25. Accordingly, in the data pad region of the liquid crystal display panel in accordance with the second embodiment of the present invention, a physical contact area of the films supporting the data pads 315A and 315B through the two first side contacts SC21 and SC31 is secured. Further, there is more increased side contact area in the films supporting the data pads 315A and 315B in comparison with the first embodiment of the present invention such that electrical contact resistance can be further reduced.

Figure 12:
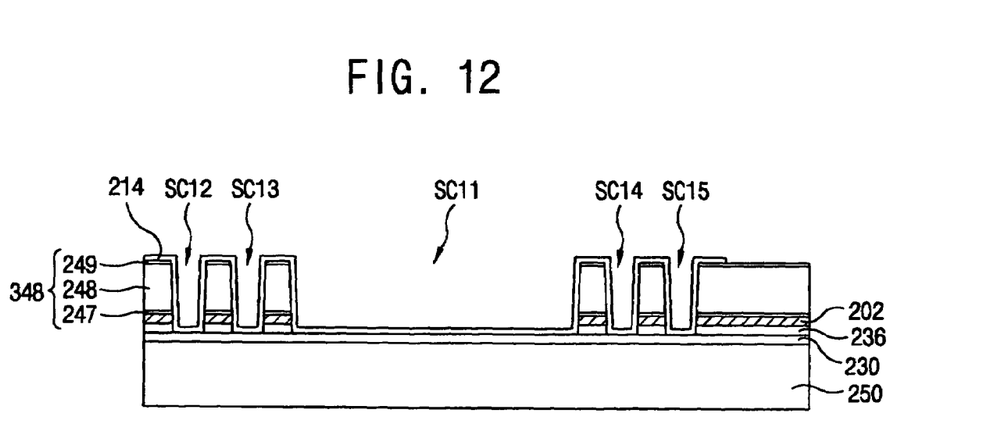
FIG. 12 is an exemplary view illustrating a section of a data pad region of a liquid crystal display penal in accordance with a third embodiment of the present invention.

FIG. 12 is an exemplary view illustrating a section of a data pad region of a liquid crystal display penal in accordance with a third embodiment of the present invention. FIG. 12 has a similar construction to FIG. 10C except that FIG. 12 has a triple deposition structure of a SiNx film 247/BCB film 248/SiNx film 249 as the passivation film 348. FIG. 12 has the same parts that have the same reference numerals as in FIG. 10.

In the related art, although the triple deposition structure of a SiNx film 247/BCB film 248/SiNx film 249 is applied as the passivation film 348 to improve interfacial adhering characteristics, when a defective TAB is detached from the data pad region, the pixel electrode 214 and the SiNx film 249 may be separated from the BCB film 248. In addition, the pixel electrode 214, the SiNx film 249 and the BCB film 248 may be separated from the SiNx film 247 by being adhered to the defective TAB. Thus, interfacial adhering characteristics is not actually improved on the data pad region.

However, in the data pad region of the liquid crystal display panel in accordance with the third embodiment of the present invention, on the bottom surface of the first side contact SC11 having an area wider than those of the plurality of the second side contacts SC12 to SC15, because the pixel electrode 214 is contacted to the gate insulating layer 230 made of SiNx or SiOx having good interfacial adhering characteristics, physical adhering force of the pixel electrode 214 is strengthened. Accordingly, as described above, when a defective TAB is detached from the data pad region, it is possible to prevent the pixel electrode 214 and the SiNx film 249 from being separated from the BCB film 248 since the pixel electrode 214 adheres to the defective TAB. In addition, it is possible to prevent the pixel electrode 214, the SiNx film 249 and the BCB film 248 from being separated from the SiNx film 247. Thus, interfacial adhering characteristics are improved by using the triple deposition structure of the SiNx film 247/BCB film 248/SiNx film 249 as the passivation film 348.

As described above, in the data pad region of the liquid crystal display device and the fabrication method thereof in accordance with the present invention, by forming the first side contact widely at the central portion of the data pad region, physical contact area of films constructing the data pads can be secured. Further, by forming a plurality of the second side contacts having an area smaller than that of the first side contact at the edge of the data pad region so as to be separated from each other at certain intervals, electrical contact area of films supporting the data pads can be secured. Accordingly, in the module process of the liquid crystal display panel, when the TAB is detached from the data pad region due to TAB defect, it is possible to prevent films formed on the data pad region from being separated such that defects in of the liquid crystal display panel can be reduced. In addition, by preventing electrical contact resistance increase on the data pad region, picture quality lowering of the liquid crystal display panel can be prevented.

It will be apparent to those skilled in the art that various modifications and variations can be made in the data pad region of liquid crystal display panel and fabricating method thereof of the present invention without departing from the spirit or scope of the inventions. Thus, it is intended that the present invention covers the modifications and variations of this invention provided they come within the scope of the appended claims and their equivalents.

What is claimed is:

1. A data pad region of a liquid crystal display panel, comprising:

a substrate having an insulating layer disposed thereon;

a plurality of data lines vertically arranged at specified intervals on the substrate;

a plurality of data pads respectively connected to the data lines, each data pad including a first contact area having a plurality of first contact regions exposing first side portions of the data line and first portions of the insulating layer, a second contact area having a plurality of second contact regions exposing second side portions of the data line and second portions of the insulating layer, and a central contact area disposed between the first and second contact areas and exposing a third portion of the insulating layer; and a conductive material disposed within each of the first, second, and central contact areas and continuously contacting each of the first and second side portions of the data line and the first and second portions of the insulating layer exposed in the first and second contact regions, respectively, and the third portion of the insulating layer, wherein a contact area of the conductive material and the third portion of the insulating layer is greater than each contact area of the conductive material and the first and second portions of the insulating layer.

2. The data pad region of claim 1, wherein the conductive material contacts one of the first side portions of the data line of the first contact area and one of the second side portions of the data line of the second contact area within the central contact area of the data pad.

3. The data pad region of claim 2, further including an active layer disposed over the substrate and contacting the plurality of date lines.

4. The data pad region of claim 1, wherein the conductive material includes a transparent conductive material.

5. The data pad region of claim 1, wherein the conductive material includes a pixel electrode.

6. A method for fabricating a data pad region of a liquid crystal display panel, comprising:
forming a gate insulating layer, data lines and a passivation film in a data pad forming region of a substrate, the data pad forming region including a first contact area having a plurality of first contact regions exposing first side portions of the data line and first portions of the gate insulating layer, a second contact area having a plurality of second contact regions exposing second side portions of the data line and second portions of the gate insulating layer, and a central contact area disposed between the first and second contact areas and exposing a third portion of the gate insulating layer; and
forming a conductive material disposed within each of the first, second, and central contact areas and continuously contacting each of the first and second side portions of the data line and the first and second portions of the gate insulating layer exposed in the first and second contact regions, respectively, and the third portion of the gate insulating layer, wherein
a contact area of the conductive material and the third portion of the gate insulating layer is greater than each contact area of the conductive material and the first and second portions of the gate insulating layer.

7. The method of claim 6, wherein the passivation film is made of an organic material.

8. The method of claim 6, wherein the passivation film is made of BCB (benzocyelobutene).

9. The method of claim 6, wherein the passivation film is formed as a triple deposition structure of SiNx film/BCB (benzocyclobutene) film/SiNx film.

10. The method of claim 6, wherein the data line is made of Mo.

11. The method of claim 6, wherein the data line is etched by dry-etching.

12. The method of claim 6, wherein the first and second portions of the gate insulating layer are exposed by dry-etching of the passivation film.

13. The method of claim 6, further comprising forming an active layer between the gate insulating layer and the data lines.

14. The method of claim 6, wherein the conductive material includes a transparent conductive material.

15. The method of claim 6, wherein the conductive material includes a pixel electrode.

16. The method of claim 6, wherein the conductive material includes a pixel electrode.

17. A data pad region of a liquid crystal display panel, comprising:
a substrate;
a gate insulating layer, data lines and a passivation film in a data pad forming region of the substrate, the data pad forming region includes a plurality of regions, wherein
a plurality of first contact holes within a first region exposes a plurality of first portions of the gate insulating layer and first side portions of the data lines,
a plurality of second contact holes within a second region exposes a plurality of second portions of the gate insulating layer and second side portions of the data lines, and
a third contact hole within a third region disposed between the first and second regions exposes a third portion of the gate insulating layer; and
a conductive material disposed within each of the first and second pluralities of contact holes and within the third contact hole, the conductive material contacting each of the first and second side portions of the data lines and the first and second portions of the gate insulating layer, wherein
a contact area of the conductive material and the third portion of the gate insulating layer is greater than each contact area of the conductive material and the first and second portions of the gate insulating layer.

18. The data pad region of claim 17, wherein the passivation film is made of an organic material.

19. The data pad region of claim 17, wherein the passivation film is made of BCB (benzocyclobutene).

20. The data pad region of claim 17, wherein the passivation film is formed as a triple deposition strueture of SiNx film/BCB (benzocyclobutene) film/SiNx film.

21. The data pad region of claim 17, wherein the data line is made of Mo.

22. The data pad region of claim 17, further comprising an active layer between the gate insulating layer and the data lines.

23. The data pad region of claim 17, wherein the conductive material includes a transparent conductive material.

24. A liquid crystal display panel, comprising:
a substrate having an image display region with unit pixels arranged in a matrix and a data pad region at the periphery of the image display region, wherein the data pad region includes:
an insulating layer on the substrate;
a plurality of data lines vertically arranged at specified intervals on the substrate;
a plurality of data pads respectively connected to the data lines;
a first contact area having a plurality of first contact regions exposing first side portions of the data lines and first portions of the insulating layer;
a second contact area having a plurality of second contact regions exposing second side portions of the data lines and second portions of the insulating layer;
a central contact area disposed between the first and second contact areas and exposing a third portion of the insulating layer; and
a conductive material disposed within each of the first, second, and central contact areas and continuously contacting each of the first and second portions of the data line and the first and second portions of the insulating layer exposed in the first and second contact regions, respectively, and the third portion of the insulating layer, wherein
a contact area of the conductive material and the third portion of the insulating layer is greater than each contact area of the conductive material and the first and second portions of the insulating layer.

25. The liquid crystal display panel of claim 24, wherein the conductive material includes a pixel electrode of the unit pixels.

26. The liquid crystal display panel of claim 24, further comprising an active layer between the insulating layer and the data lines.

* * * * *